United States Patent [19]

Heep et al.

[11] Patent Number: 4,909,273
[45] Date of Patent: Mar. 20, 1990

[54] TWO-WAY PIPE SWITCH

[75] Inventors: Dieter Heep, Bergatreute; Paul Vogel, Weingarten; Wolfgang Horn, Baienfurt, all of Fed. Rep. of Germany

[73] Assignee: Waeschle Maschinenfabrik GmbH, Ravensburg, Fed. Rep. of Germany

[21] Appl. No.: 337,634

[22] Filed: Apr. 13, 1989

[30] Foreign Application Priority Data

Apr. 19, 1988 [DE] Fed. Rep. of Germany ....... 3813074

[51] Int. Cl.$^4$ .............................................. F16K 11/06
[52] U.S. Cl. ............................... 137/240; 137/625.47; 137/876; 406/183
[58] Field of Search ................... 137/240, 625.47, 876; 406/183

[56] References Cited

U.S. PATENT DOCUMENTS

3,489,178 1/1970 Kice .................................. 406/183
4,836,250 6/1989 Krambrock ..................... 137/876 X Primary Examiner—Gerald A. Michalsky
Attorney, Agent, or Firm—Henry M. Feiereisen

[57] ABSTRACT

A two-way pipe switch for bulk material includes a housing with an inlet port, a coaxial first outlet port connectable to the inlet port to define a first flow path and a second outlet port connectable to the inlet port to define a second flow path which rectangularly branches off the first flow path. Accommodated in the housing is a cock which is rotatable by about 120° from a first position into a second position for selectively connecting the inlet port with the first and second outlet ports. The housing has a cylindrical inner wall which between the inlet port and the first outlet port defines a first area and between the inlet port and the second outlet port defines a second area, with each area being provided with a pocket-like recess facing the respective outlet port and including edges which cooperate with the respective end face of the cross piece in such a manner that bulk material particles are prevented from penetrating the respective sealing gaps. A third area of the inner housing wall extending between the first and second outlet ports is provided with bores through which compressed air is introduced for preventing penetration of bulk material particles also in this area.

15 Claims, 6 Drawing Sheets

Fig. 8 ically, flat.In. Accommodated in the housing # TWO-WAY PIPE SWITCH

BACKGROUND OF THE INVENTION

The present invention refers to a pipe switch or multiport valve, in particular to a two-way pipe switch such as a two-way multiport valve for regulating a flow of bulk material between one inlet and two outlets.

The German patent No. 35 02 818 describes a two-way pipe switch for bulk material which has a housing with an inlet port connectable to a coaxial first outlet port via a first flow path and to a second outlet port via a second flow path which branches off rectangularly from the first flow path. Accommodated in the housing is a cock which regulates the flow from the inlet port to the outlet ports and includes two spaced lateral circular disks connected by a cross piece at a level so as to allow to block one outlet port when the cock is in one end position and to block the other outlet port when the cock occupies the other end position. Such a pipe switch allows the supply of granulated or pulverulent bulk material to a silo arranged below the second outlet port by turning the cock by 90° from the first end position to the second end position. Thus, the cross piece of the cock extends perpendicular to the first flow path and acts as baffle plate. Such a rectangular deflection of the flow of bulk material in the second position of the cock results in a considerable pressure drop. Further, the cock can be reversed or controlled only after cleaning the conduit in order to be free of bulk material. Such cleaning is necessary because when shutting off the conveying, particles of bulk material still present in the conduit can penetrate during changing of the cock at least from the second end position to the first end position into the gap between the cross piece at its end face facing away from the bulk material flow and the area of the inner housing wall between the first and second outlet port so that eventually the rotation of the cock will be blocked.

A further drawback of the two-way pipe switch according to DE-PS No. 35 02 818 resides in the fact that upon changing the cock from the first end position into the second end position during continuous flow of bulk material, particles penetrate into the gap between the respective end face of the cross piece and the area of the inner housing wall between the inlet port and the first outlet port.

SUMMARY OF THE INVENTION

It is thus an object of the present invention to provide an improved two-way pipe switch obviating the aforestated drawbacks.

This object and others which will become apparent hereinafter, are attained in accordance with the present invention by providing a pocket-like recess in a first area of the cylindrical inner wall between the inlet port and the first outlet port and in a second area between the inlet port and the second outlet port, with each recess communicating with the first and second outlet ports, respectively, and being passed by the respective end face of the cross piece when the cock shifts between the first and second end positions.

Through the provision of such pocket-like recesses, bulk material particles are prevented from penetrating the respective sealing gaps between the end faces of the cross piece and the inner housing wall as the end faces of the cross piece will force these particles into the pockets from where they drop to the respective outlet port. Preferably, the recesses have a depth which is at least equal to the greatest prevailing diameter of the granulates or grain of the bulk material.

According to a further feature of the present invention, the recesses are of triangular shape with a base having a length corresponding to the length of the end faces and with an apex arranged at a suitable level at the inner housing wall so as to ensure the end faces of the cross piece to pass the apex when the cock is shifted between the first and second end positions.

The sides of the triangle converging toward the apex cooperate with the respective end faces of the cross piece of the cock to displace bulk material particles present in the respective gaps into the pockets and to discharge them into the first and second outlet ports.

In order to prevent penetration of bulk material particles also in an area of the inner housing wall which extends between the first and second outlet ports and is passed by the end faces of the cross piece during turning of the cock between the end positions, a plurality of bores is provided in this area via which compressed air is introduced.

Despite the relatively complicated geometry of the inner housing wall, the two-way pipe switch can still easily be manufactured and yet is characterized by a tight sealing, especially when designing at least the first flow path with a rectangular cross section.

Suitably, compressed air is blown through the bores in the area between the outlet ports only during a shift of the cock from the first to the second end position. This is attained by providing a source of compressed air and a valve which regulates the supply of compressed air to the bore in dependence on the position of the cock. The valve cooperates with a cam which is supported on a respective journal rotatably mounted in a side cover plate of the housing of the cock. Thus, in each end position of the cock, the valve interrupts the supply of compressed air while during shifting of the cock between the end positions the valve allows compressed air to be introduced through the bores into the area between the outlet ports.

Especially when conveying soft granular material, the cross piece is preferably provided with a covering plate which extends between the end faces of the cross piece at their edges facing away from the flow of bulk material and has the shape of a cylindrical segment coaxial to the inner cylindrical housing wall. The covering plate allows the backside of the cross piece to be kept free from bulk material when the cock is in the second end position so that the sealing gap between the first and second outlet ports communicating with the bores through which compressed air is introduced is additionally protected against penetration of bulk material particles during displacement of the cock between the first and second end positions.

For certain bulk material such as hard granular material, the gap sealing of the pipe switch is sufficient. However, especially when conveying pulverulent bulk material, it is preferred to seal the end faces of the cross piece by a profiled seal and to insert an annular between each side cover plate of the housing and the pertaining lateral disk of the cock.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 1:
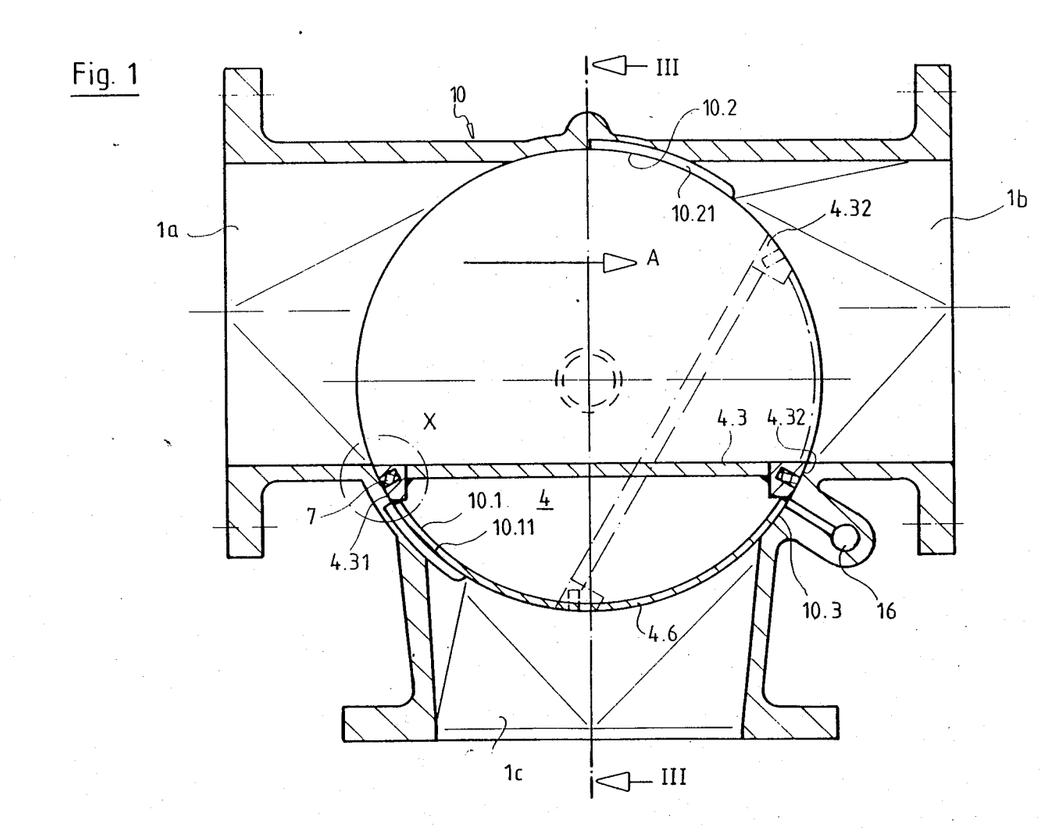
FIG. 1 is a longitudinal section of one embodiment of a two-way pipe switch according to the invention taken along the line I—I in FIG. 3 and illustrating the cock in one end position.
Figure 2:
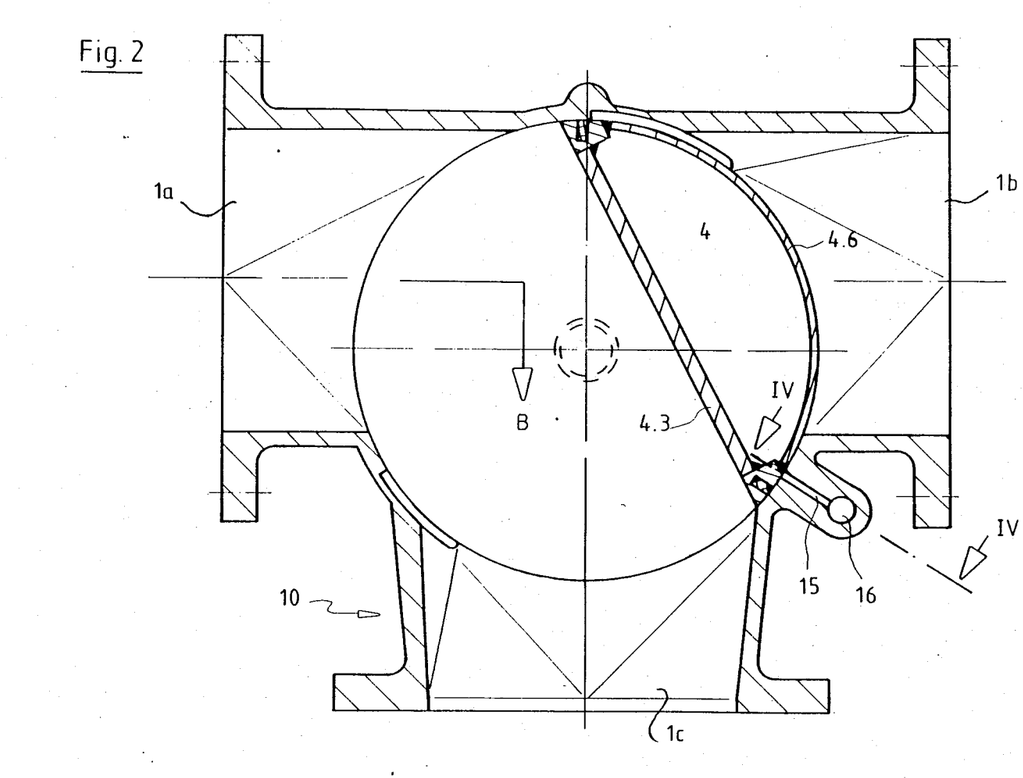
FIG. 2 is a longitudinal section of the two-way pipe switch of FIG. 1, with the cock being in another end position.

Referring now to the drawing, there is shown one embodiment of a two-way pipe switch or two-way multiport valve which has a housing generally designated by reference numeral 10. As illustrated in FIGS. 1 and 2, the housing 10 is a tee with three pipe flanges respectively defining an inlet port 1a, a first outlet port 1b and a second outlet port 1c.

Accommodated within the interior of the housing 10 is a cock 4 which regulates the flow of a fluid such as bulk material from the inlet port 1a to the outlet ports 1b, 1c. As shown in FIG. 1 by continuous lines, the cock 4 occupies a first end position in which the inlet port 1a is connected with the outlet port 1b so as to allow a straight flow as indicated by arrow A. The dash-dot illustration of the cock 4 shows an intermediate position thereof during its displacement to the second end position at which point a flow from inlet port 1a to outlet port 1c according to arrow B is obtained as illustrated in FIG. 2.

Figure 3:
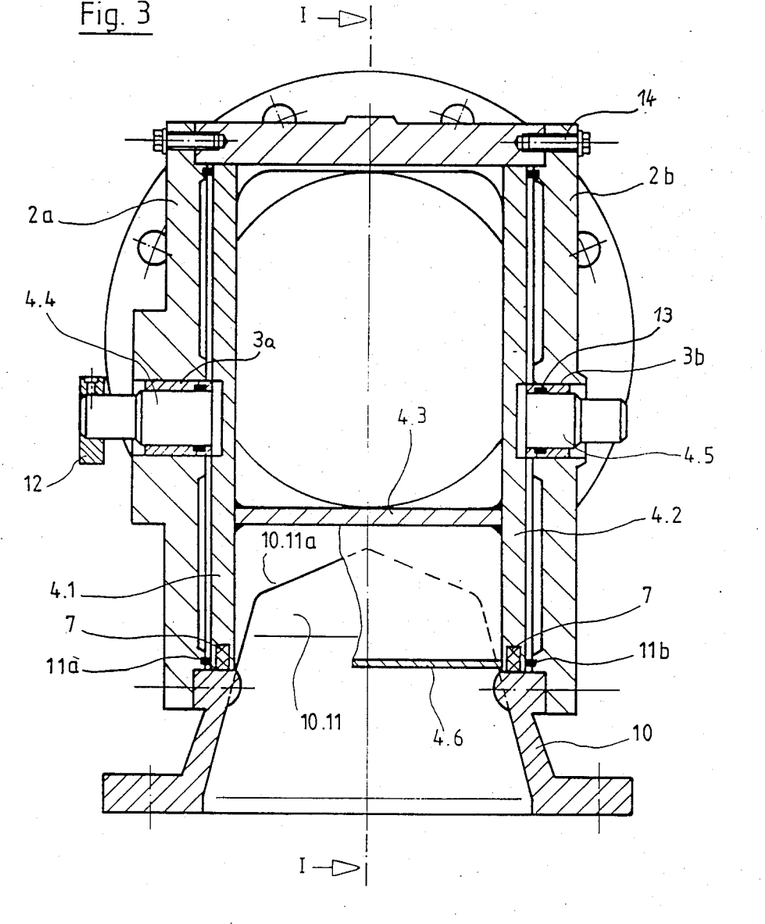
FIG. 3 is a cross sectional view of the two-way pipe switch taken along the line III—III in FIG. 1.

Turning now in particular to FIG. 3, which shows a cross sectional view of the two-way pipe switch taken along the line III-III in FIG. 1, it can be seen that the cock 4 includes two circular disks 4.1, 4.2 spaced from each other and arranged at opposing sides of the housing 10. The circular disks 4.1, 4.2 are connected to each other via a cross piece or bridge 4.3 which defines an angle of less than 90° with the center axis as defined by the first flow path A when the cock 4 occupies the second end position. The disks 4.1, 4.2 are provided with a journal 4.4, 4.5 rotatably mounted in respective side cover plates 2a, 2b via bushings 3a, 3b which are suitably sealed by gaskets 13. The cover plates 2a, 2b are connected to the housing 10 via screws 14, and annular seals 11a, 111b are disposed between the lateral disks 4.1, 4.2 and the pertaining cover plates 2a, 2b.

The journal 4.4 is extended beyond the cover plate 2a for supporting a control cam 12, the purpose of which will be described furtherbelow. Likewise, the journal 4.5 extends beyond the cover plate 2b and is adapted for connection with a motored drive and/or a hand lever which are, however, not shown for ease of illustration.

Figure 5:
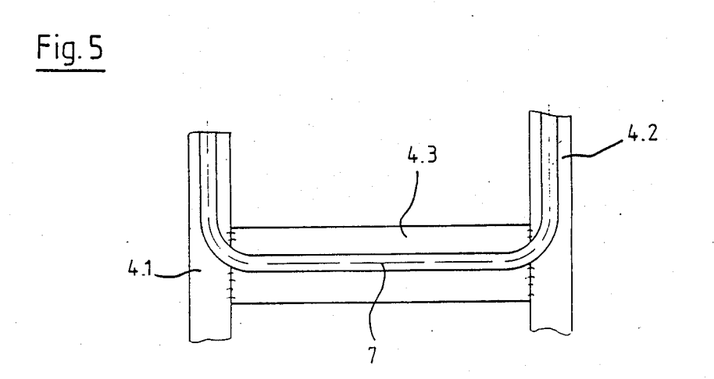
FIG. 5 is a plain view of a detail X of the cock as indicated in FIG. 1.
Figure 6:
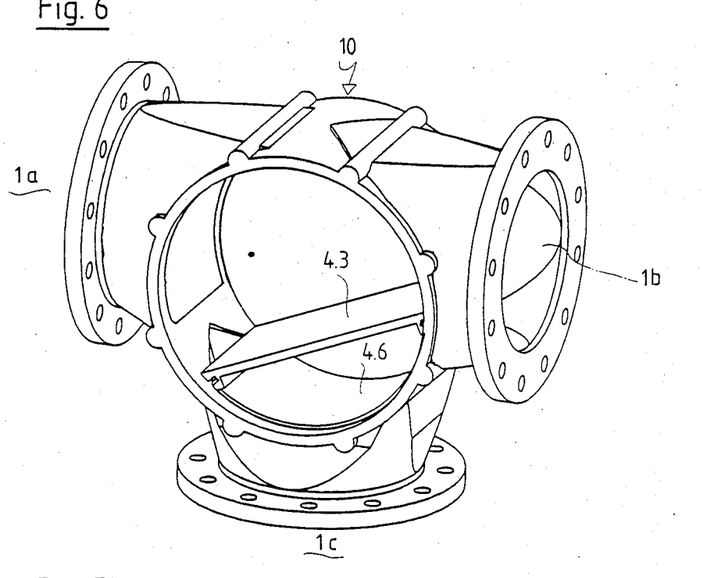
FIG. 6 is a perspective view of the two-way pipe switch, illustrating in particular the housing with the cock being in an intermediate position.
Figure 7:
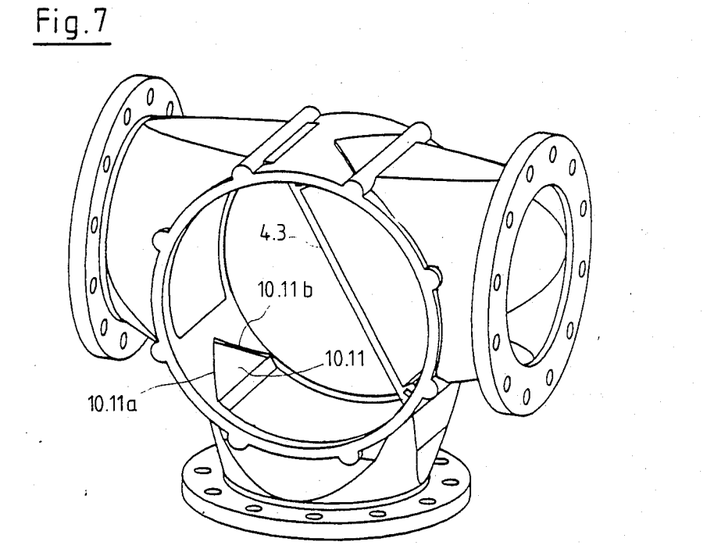
FIG. 7 is a perspective view of the two-way pipe switch similar to FIG. 6, with the cock occupying the other end position.
Figure 8:
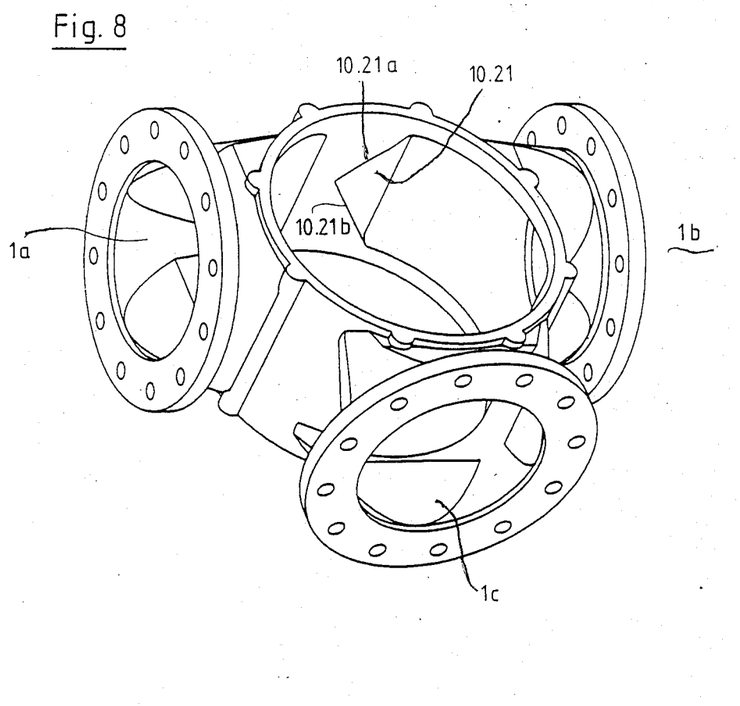
FIG. 8 is a further perspective view of the two-way pipe switch illustrating the housing thereof without the cock.

In order to facilitate the sealing of the end faces 4.31, 4.32 of the cross piece 4.3 of the cock, the flow paths A and B are of rectangular cross section as particularly shown in FIGS. 6 to 8. Each end face 4.31, 4.32 of the cross piece 4.3 is profiled so as to define a groove for accommodating a seal 7 which thus is protected from the bulk material. As indicated in FIGS. 3 and 5, the seal 7 runs from the end faces 4.31, 4.32 along the disks 4.1, 4.2 of the cock 4 at the perimeter facing away from the bulk material so as to be protected therefrom.

At its backside which faces away from the flow of bulk material, the cross piece 4.3 is provided with a cover plate 4.6 which extends in form of a segment of a cylinder between the end faces 4.31, 4.32 at their edges distant to the bulk material flow and has a curvature adapted to run along the cylindrical inside wall surface of the housing 10.

As is further shown in FIGS. 1 and 2, the housing 10 is provided at its inner wall in vicinity of the end face 4.31 of the cross piece 4.3 when the cock 4 occupies its first end position with a first area 10.1 which includes a pocket-like recess 10.11. Suitably, the depth of the recess 10.11 is at least equal to the greatest prevailing diameter of the bulk material particles to be transported. Opposite to the area 10.1, the inner wall of the housing 10 is provided with a second area 10.2 which extends in vicinity of the end face 4.32 of the cross piece 4.3 when the cock 4 occupies its second end position and includes a pocket-like recess 10.21, the depth of which is also at least equal to the greatest prevailing diameter of the bulk material particles to be conveyed.

As can be seen from FIGS. 6–8, which show various perspective views of the housing 10, the recesses 10.11, 10.21 as seen in top view—are shaped in form of a isosceles triangle, with a base having a length corresponding to the one of the end faces 4.31, 4.32 of the cross piece 4.3 and respectively facing the outlet ports 1b, 1c. The triangular-shaped recesses 10.11, 10.12 define each an apex which lies on a generatrix of the cylindrical inner wall of the housing 10 at a level which ensures that the seal 7 completely passes the apex of each recess 10.11, 10.12 when the cock 4 is moved into the respective end positions as shown in particular in FIGS. 1 and 2. Thus, when the cock 4 is moved between the end positions, the edges 10.11a, 10.11b; 10.21a 10.21b of the respective pockets 10.11, 10.21 together with the end faces 4.31, 4.32 of the cross piece 4.3 force bulk material disposed in these areas to be discharged into the pockets 10.11, 10.21 and eventually to drop into the first and second outlet ports 1b, 1c. By means of these pockets 10.11, 10.21, bulk material is prevented from getting stuck in the respective sealing gaps which would easily lead to a blocking or jamming of the cock 4.

Figure 4:
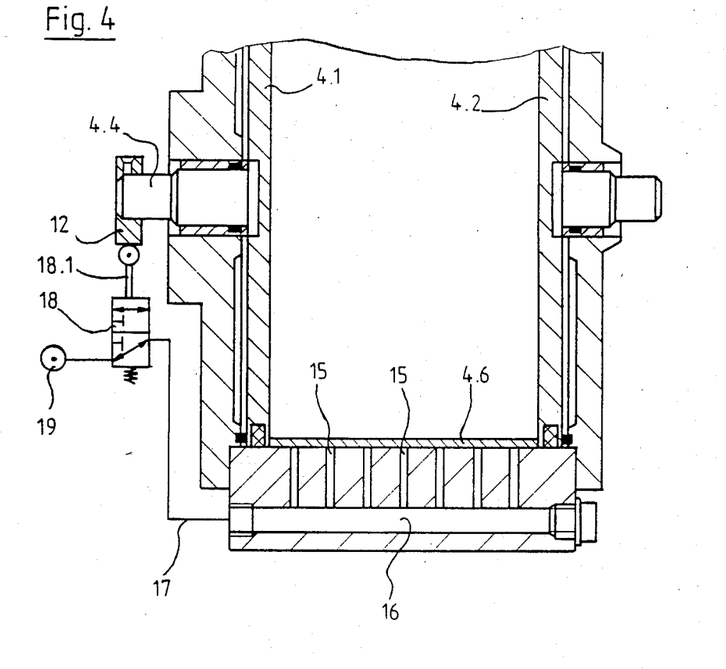
FIG. 4 is a partial sectional view of the two-way pipe switch taken along the line IV—IV in FIG. 2.

In order to prevent a penetration of bulk material also in an area 10.3 of the inner wall of the housing 10 which extends at the junction of the housing 10 between the outlet ports 1b, 1c and thus is passed by both end faces 4.31, 4.32 of the cross piece 4.3 during displacement of the cock 4 between the end positions, compressed air is blown into this sealing gap in the area 10.3 of the housing 10 via a plurality of parallel bores 15 which are spaced along the width of the area 10.3. As shown in FIG. 4 which is a sectional view taken along the line IV—IV in FIG. 2, the bores 15 commonly communicate with a channel 16 which is supplied with compressed air from a respective source 19 via a schematically illustrated conduit 17 and a valve 18. Via a valve tappet 18.1, the valve 18 is controlled by the cam 12 which—as previously described is supported on the journal 4.4. The valve 18 is controlled by the cam 12 in such a manner that compressed air is blown into the sealing gap in the area 10.3 of the inner housing wall only when the cock 4 is shifted between the end positions while the supply of compressed air is interrupted when the cock occupies either one of the end positions. Thus, bulk material particles are also prevented from penetrating this sealing gap or from being drawn into the sealing gap by the rotation of the cock.

While the invention has been illustrated and described as embodied in a two-way pipe switch, it is not intended to be limited to the details shown since various modifications and structural changes may be made without departing in any way from the spirit of the present invention.

What is claimed as new and desired to be protected by Letters Patent is set forth in the appended claims:

We claim:

1. A two-way pipe switch for a material such as bulk material, comprising:
   a housing having an inlet port, a first outlet port connectable to said inlet port to define a first flow path and a second outlet port connectable to said inlet port to define a second flow path which branches off said first flow path;
   regulating means accommodated in said housing and movable between two end positions for controlling the flow of material from said inlet port to said first and second outlet ports, said housing having an inner wall which defines a first area between said inlet port and said first outlet port and a second area between said inlet port and said first outlet port, each of said first and second areas of said inner housing wall being provided with a pocket-like recess facing the respective outlet port and being passed by said regulating means when the latter shifts between said first and second end positions; and
   blowing means for introducing a fluid into an area of said inner housing wall extending between said first and second outlet ports.

2. A two-way pipe switch as defined in claim 1 wherein said regulating means includes a cock having two circular disks laterally arranged at said housing and a cross piece connecting said disks with each other at a level thereof sufficient to block said second outlet port when said cock is in said first end position for conveying material along said first flow path and to block said first outlet port when said cock is in said second end position for conveying material along said second flow path, said first flow path defining a center axis wherein said cross piece extends at an angle of less than 90° relative to said center axis when said cock is in said second end position.

3. A two-way pipe switch as defined in claim 2 wherein said cross piece has opposing end faces facing said inner housing wall and being of a predetermined length, each of said pocket-like recesses—as seen in top view—being shaped in form of an isosceles triangle, with a base having a length corresponding to the length of said end faces and with an apex arranged at a sufficient level at said inner housing wall to ensure said end faces of said cross piece to pass the apex of said recesses with their edge facing the flow of material when said cock is shifted between said first and second end positions.

4. A two-way pipe switch as defined in claim 2 wherein said inner housing wall is of cylindrical shape, said cross piece being provided with a covering plate extending between said end faces at the side of said cross piece facing away from said flow paths of material, said covering plate being shaped in form of a segment of a cylinder coaxial to said cylindrical inner housing wall.

5. A two-way pipe switch as defined in claim 1 wherein said inner housing wall is provided in said area between said first and second outlet ports with a plurality of bores via which the fluid is introduced into said area between said first and second outlet ports.

6. A two-way pipe switch as defined in claim 5 wherein said blowing means includes a fluid source communicating with said bores via a connection, and a valve interposed in said connection and being open as long as said cock is in an intermediate position between said end positions for allowing the supply of fluid to said bores and into said area between said first and second outlet ports.

7. A two-way pipe switch as defined in claim 6, and further comprising a journal for rotatably supporting said cock at each side of said housing about an axis perpendicular to the center axes of said first and second flow paths, one of said journals supporting a cam cooperating with said valve for controlling the supply of fluid in dependence on the position of said cock.

8. A two-way pipe switch as defined in claim 1 wherein at least said first flow path is of rectangular cross section.

9. A two-way pipe switch as defined in claim 1, and further comprising sealing means provided in said regulating means for sealing the latter against said inner housing wall.

10. A two-way pipe switch as defined in claim 9 wherein said regulating means includes a cock having two circular disks laterally arranged at said housing and a cross piece having opposing end faces facing said inner housing wall and connecting said disks with each other so that the latter has one section facing the material and another section facing away from the material, said end faces of said cross piece and said other section of said disks being provided with a continuous groove, said sealing means including a continuous profiled seal accommodated in said groove and bearing upon said inner housing wall.

11. A two-way pipe switch as defined in claim 10 wherein said housing is provided with side cover plates extending parallel to said lateral disks of said regulating means, and further comprising further sealing means for providing a seal between said disks and said side cover plates.

12. A two-way pipe switch as defined in claim 11 wherein said further sealing means includes an annular seal.

13. A two-way pipe switch as defined in claim 1 wherein said housing is a tee with said second flow path extending perpendicular to said first flow path.

14. A two-way pipe switch as defined in claim 1 wherein said fluid is compressed air.

15. A two-way pipe switch for bulk material, comprising:
   a housing having an inlet port, a coaxial first outlet port connectable to said inlet port to define a first flow path and a second outlet port connectable to said inlet port to define a second flow path which rectangularly branches off said first flow path;

regulating means accommodated in said housing and movable between two end positions for controlling the flow of material from said inlet port to said first and second outlet ports, said regulating means including a cock having two circular disks laterally arranged at said housing and a cross piece connecting said disks with each other at a level thereof so as to block said second outlet port when said cock is in said first end position for conveying material along said first flow path and to block said first outlet port when said cock is in said second end position for conveying material along said second flow path, said first flow path defining a center axis, with said cross piece extending at an angle of less than 90° relative to said center axis when said cock in said end second position, wherein said housing has a cylindrical inner wall which defines a first area between said inlet port and said first outlet port and a second area between said inlet port and said first outlet port, each of said first and second areas of said inner housing wall being provided with a pocket-like recess facing the respective outlet port, said cross piece having opposing end faces facing said inner housing wall and being of a predetermined length, each of said pocket-like recesses—as seen in top view—being shaped in form of an isosceles triangle, with a base having a length corresponding to the length of said end faces and with an apex arranged at a sufficient level at said inner housing pass the apex of said triangular-shaped pocket-like recesses with their edge facing the flow of material when said cock is shifted between said first and second end positions; and blowing means for introducing compressed air through bores in said inner housing wall along an area extending between said first and second outlet ports.

* * * * *

UNITED STATES PATENT AND TRADEMARK OFFICE
CERTIFICATE OF CORRECTION

PATENT NO. : 4,909,273

DATED : March 20, 1990

INVENTOR(S) : DIETER HEEP, PAUL VOGEL & WOLFGANG HORN

It is certified that error appears in the above-identified patent and that said Letters Patent is hereby corrected as shown below:

COLUMN 8, LINE 11, after "housing" add -- wall to ensure said end faces of said cross piece to --

Signed and Sealed this

Nineteenth Day of March, 1991

Attest:

HARRY F. MANBECK, JR.

Attesting Officer

Commissioner of Patents and Trademarks